(No Model.) 2 Sheets—Sheet 2.
G. PILSON.
WINDOW CLEANING IMPLEMENT.
No. 418,959. Patented Jan. 7, 1890.
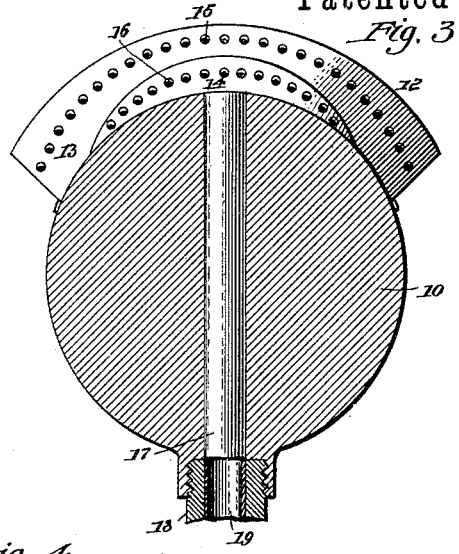
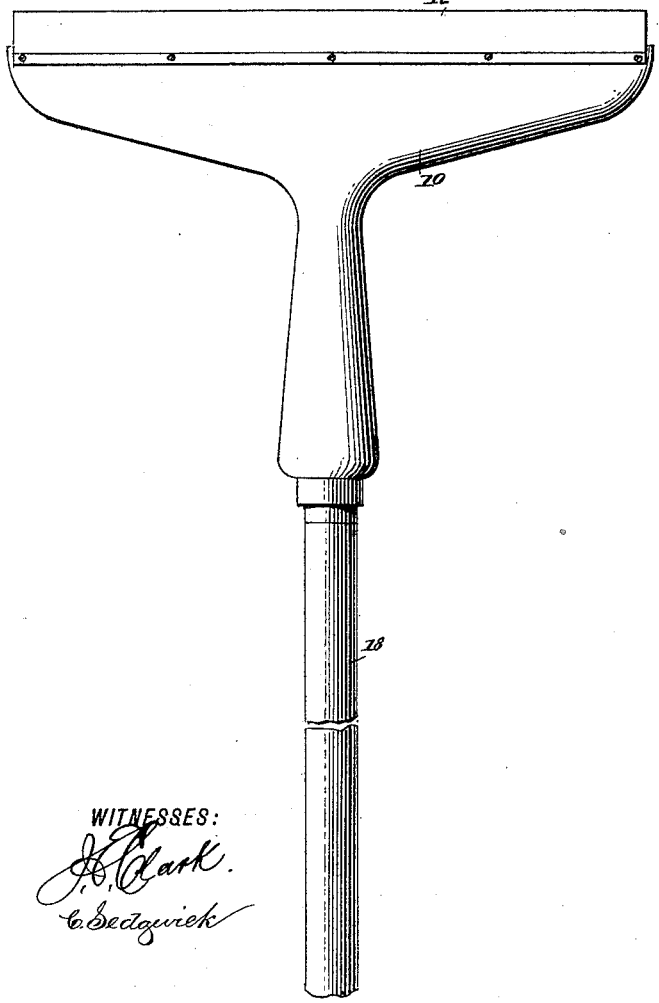
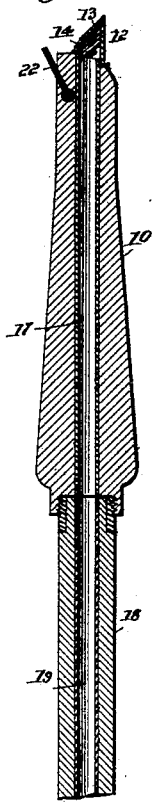
WITNESSES:
J. H. Clark.
C. Sedgwick.
INVENTOR:
G. Pilson
BY Munn & Co.
ATTORNEYS.

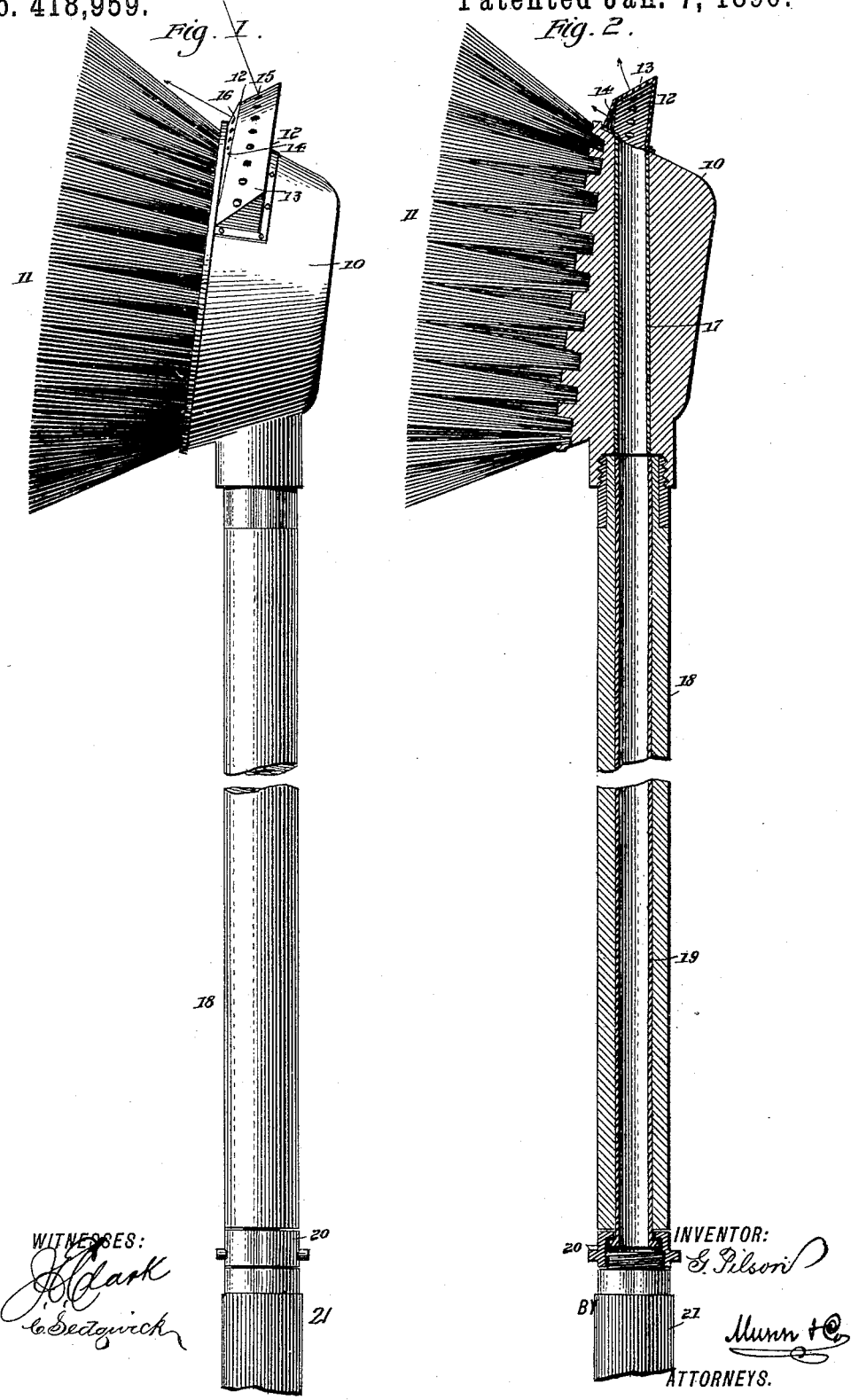

UNITED STATES PATENT OFFICE

GEORGE PILSON, OF YONKERS, NEW YORK.

WINDOW-CLEANING IMPLEMENT.

SPECIFICATION forming part of Letters Patent No. 418,959, dated January 7, 1890.

Application filed June 6, 1889. Serial No. 313,316. (No model.)

*To all whom it may concern:*

Be it known that I, GEORGE PILSON, of Yonkers, in the county of Westchester and State of New York, have invented a new and useful Improvement in Window-Cleaning Implements, of which the following is a full, clear, and exact description.

My invention relates to an improvement in window-cleaning implements, and has for its object to provide a means whereby a continuous supply of water will be fed to the cleaning or contacting surface of the implement, and wherein, also, a continuous spray will be delivered upon the article to be cleaned above the cleaning-surface of the implement.

A further object of the invention is to produce this result by devices simple and durable in construction and capable of application to almost any form of window-cleaning implement in use.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a side elevation of a window-cleaning brush having my improvement applied thereto. Fig. 2 is a longitudinal vertical section through the brush and handle. Fig. 3 is a horizontal section through the head-block of the brush. Fig. 4 illustrates the application of the improvement to a window-cleaning implement having a rubber-cleaning surface attached to its head, and Fig. 5 is a central vertical section through the form of implement illustrated in Fig. 4.

I will first describe the invention as applied to a brush, as illustrated in Figs. 1, 2, and 3. Upon the upper side face of the brush-block 10, having bristles 11 or their equivalent secured thereto, a preferably-semicircular receptacle or pan 12 is attached in any approved manner, the outer face whereof is downwardly beveled from the top, as shown at 13, preferably to a point below the center of the outer edge, and from thence the said outer face is carried at an acute angle to a connection with the head-block near the edge of the face in which the bristles are secured, as best shown at 14 in Figs. 1 and 2.

In imparting the above-described contour to the outer side face of the pan-like receptacle the upper beveled surface 13 is preferably made to extend from end to end of the receptacle, as illustrated in Figs. 1 and 3, whereby the lower beveled surface is much shorter. In the upper beveled surface 13 of the pan-like receptacle a series of apertures 15 is produced, and a second series of apertures 16 is formed in the lower beveled surface, as is likewise best illustrated in Figs. 1 and 3.

The pan-like receptacle 12 is closed on all sides except at the bottom, the side, the head-block to which the receptacle is attached forming its wall at this point. The receptacle may be made of any suitable material, preferably of light sheet metal. In the head a bore is produced extending from the bottom to the top and leading into the receptacle, preferably at or near its center, as shown in Fig. 2, and in the said bore a tube 17 is usually located.

The handle 18 is secured to the head-block 10 in any approved manner, being illustrated as screwed thereto, and the said handle is provided, likewise, with a longitudinal bore extending through from end to end, into which bore a tube 19 is introduced, connecting at its upper end with the tube 17 in the head-block, and provided at its lower end with a swivel-coupling 20, adapted to receive the end of a hose 21.

It will be observed that by reason of the construction of the pan-like receptacle 12 the upper series of apertures will deliver a spray of water when the water is forced into the pan over the top of the brush, and that the said spray will contact also with the surface the brush is employed in cleaning. The lower series of apertures 16 will deliver the spray at a more acute angle, and therefore, instead of passing over the brush, the spray from these apertures will pass downward through the bristles, thereby keeping the said bristles supplied with water at all times to facilitate their work.

In Figs. 4 and 5 I have shown the application of the improvement to a head 10, having attached thereto a rubber strip 22, also adapted for cleaning windows, and as the article is well known I will not describe the construction of it. A pan-like receptacle 12, apertured as above set forth, is in this event located at the front end of the head immediately above the rubber 22, as shown in Fig. 5, and the head 10 of this form of cleaning implement and the handle is bored in similar manner to the head and handle of the brush. In this latter form of cleaning implement the pan-like receptacle, if preferred, may be made to extend from end to end of the head.

I desire it to be distinctly understood that it is not absolutely necessary that the tube should be projected through the head and through the handle, as, if its parts are made of metal or of a hard wood, the tubes may be dispensed with, and the bore formed therein will suffice.

Having thus described my invention, I claim as new and desire to secure by Letters Patent—

1. An improved window-cleaning implement comprising a head having a bore extending through it, a hollow handle secured to one side of the head, with its bore in alignment with the bore of the head, and a receptacle secured to the side of the head opposite the handle, and having two inclined or beveled faces provided with a series of apertures, substantially as described.

2. The herein-described window-cleaning implement, consisting of the head 10, having a bore extending through it, the hollow handle 18, secured to the head, with its bore in alignment with the bore of the head, and the receptacle 12, secured to the head opposite the handle, and having two inclined or beveled faces of unequal length, each of the said faces being provided with a series of apertures, substantially as herein shown and described.

GEORGE PILSON.

Witnesses:
S. H. THAYER, Jr.,
CHARLES PHILIP PRESTON.